United States Patent [19]
Pretzer et al.

[11] Patent Number: 5,939,477
[45] Date of Patent: Aug. 17, 1999

[54] SILICONE PRESSURE SENSITIVE ADHESIVE COMPOSITION CONTAINING FUNCTIONALIZED POLYISOBUTYLENE

[75] Inventors: Paul William Pretzer; Randall Paul Sweet, both of Midland, Mich.

[73] Assignee: Dow Corning Corporation, Midland, Mich.

[21] Appl. No.: 09/016,954

[22] Filed: Feb. 2, 1998

[51] Int. Cl.$^6$ .............. C08K 5/24; C08K 5/54; C08F 283/12
[52] U.S. Cl. .................. 524/261; 524/268; 525/477
[58] Field of Search ................. 524/261, 268; 525/477

[56] References Cited

U.S. PATENT DOCUMENTS

| | | |
|---|---|---|
| 2,676,182 | 4/1954 | Daudt et al. . |
| 2,736,721 | 8/1956 | Dexter et al. . |
| 2,814,601 | 11/1957 | Currie et al. . |
| 2,857,356 | 10/1958 | Goodwin, Jr. . |
| 4,584,355 | 4/1986 | Blizzard et al. . |
| 4,585,836 | 4/1986 | Homan et al. . |
| 4,591,622 | 5/1986 | Blizzard et al. . |
| 4,655,767 | 4/1987 | Woodard et al. . |
| 4,865,920 | 9/1989 | Sweet . |
| 5,079,008 | 1/1992 | Sinnreich et al. . |
| 5,147,916 | 9/1992 | Sweet . |
| 5,176,915 | 1/1993 | Hoffman . |
| 5,300,291 | 4/1994 | Sablotsky et al. . |
| 5,342,623 | 8/1994 | Enscore et al. . |

OTHER PUBLICATIONS

Lickiss, P.D. "Advances in Inorganic Chemistry," v. 42, p. 142, 1995.
Wilczek, L. et al. J. Macromol. Sci.–Chem., A24(9), 1033–1049 (1987).
U.S. Serial No. 08/794,695.

*Primary Examiner*—Nathan M. Nutter
*Attorney, Agent, or Firm*—Richard I. Gearhart

[57] ABSTRACT

A pressure sensitive adhesive composition which contains a mixture of a silicate resin, a polyorganosiloxane fluid, and a polyisobutylene polymer having at least one functionalized silicon containing moiety. One advantage of the present invention is that it provides a silicone pressure sensitive adhesive composition that has a reduced propensity for cold flow relative to many current silicone pressure sensitive adhesives.

20 Claims, No Drawings

5,939,477

SILICONE PRESSURE SENSITIVE ADHESIVE COMPOSITION CONTAINING FUNCTIONALIZED POLYISOBUTYLENE

FIELD OF THE INVENTION

The present invention relates generally to pressure sensitive adhesive compositions and, more particularly to silicone pressure sensitive adhesive compositions containing polyisobutylene polymer having at least one functionalized silicon containing moiety.

BACKGROUND OF THE INVENTION

A pressure sensitive adhesive, generally, is a material which adheres to a surface with pressure and can release from a surface with negligible transfer of the material to the surface. Silicone pressure sensitive adhesives have been found to be preferred over other types of pressure sensitive adhesives in many applications, especially in the medical area. For example, silicone pressure sensitive adhesives, due to the fact that they are acceptable for topical use, have found use in transdermal drug delivery applications which involve the adherence and sealing of a drug-containing patch to a patient's skin.

However, many current silicone pressure sensitive adhesives experience a degree of "cold flow", that is, flowing or softening at temperatures near room temperature. The amount of cold flow is increased when the silicone pressure sensitive adhesive is in contact with a patient's skin, as the higher temperature of a patient's skin causes a further softening of the silicone pressure sensitive adhesive. Flowing or softening of the silicone pressure sensitive adhesive can cause shifting of the pressure sensitive adhesive on the drug-containing patch during storage or use which can decrease the efficacy of the drug-containing patch. There is, therefore, a need for a silicone pressure sensitive adhesive having a reduced propensity for cold flow.

U.S. Pat. No. 5,079,008 to Sinnreich et al. teaches a monolith transdermal therapeutic system for the delivery of permeable drugs, especially formoterol, in the form of a matrix system comprising three layers: a) a backing layer which is impermeable to the components of the adhesive layer b), b) an adhesive layer capable of releasing the drug and consisting of a permeable polymeric material which is compatible with the skin and contains at least one drug which is capable of permeation across the skin, a combination of eucalyptol having a purity of at least 70% with an additional flux enhancer and further optional pharmaceutical excipients, and c) a protective release liner which can be peeled from the adhesive contact layer b).

U.S. Pat. No. 5,176,915 to Hoffmann teaches a plaster used as therapeutic system for the administration of active substances to the skin exhibiting a graduated active substance release, to the process for the production of such a plaster, and to the use for the local or systemic dermal administration of active substances in the human or veterinary medicine, or in cosmetics.

U.S. Pat. No. 5,300,291 to Sablotsky et al. teaches a method of increasing the adhesiveness of a shaped pressure sensitive adhesive, comprising adding an adhesive and drug release increasing amount of a clay to said adhesive prior to casting of the adhesive. A dermal composition comprising a drug, a pressure sensitive adhesive, an adhesiveness increasing amount of a clay and a solvent. A dermal composition comprising a drug, a multipolymer of ethylene vinyl acetate, an acrylic polymer, a natural or synthetic rubber and a clay, along with optional ingredients know for use in transdermal drug delivery systems.

U.S. Pat. No. 5,342,623 to Enscore et al. teaches rate controlled transdermal delivery devices which utilize an in-line adhesive to maintain the device on the skin and deliver an agent which is a solvent or a plasticizer for the in-line adhesive. The initial equilibrated concentration of the agent in the agent reservoir and the adhesive is below saturation, and the reservoir comprises the agent dissolved in a solvent with respect to which the rate controlling element of the device is substantially impermeable. In preferred embodiments the initial loading of the agent in reservoir is sufficient to prevent the activity of the agent in the reservoir from decreasing by more than about 50% and preferably no more than about 25% during the predetermined period of administration; and the thicknesses of the adhesive, rate controlling membrane and reservoir layers are selected so that at least 50% and preferably at least 75% initial equilibrated agent loading is in the reservoir layer. The devices are usable to deliver agents which are liquid at body temperatures such as benztropine, secoverine, nicotine, arecoline, polyethylene glycol monolaurate, glycerol monolaurate, glycerol monooleate and ethanol, for example.

All of the aforementioned references teach pressure sensitive adhesives containing polyisobutylene polymers, but none teach the combination of polyisobutylene and silicone components.

Other desirable attributes of a pressure sensitive adhesive of this invention include the biocompatibility of the pressure sensitive adhesive to animal skin and the capability of (a) making the pressure sensitive adhesive hot-meltable, (b) modifying the properties of the pressure sensitive adhesive, such as drug permeability, solubility, adhesiveness, releasibility, and tackiness, and (c) making the pressure sensitive adhesive either transparent or white resulting in an aesthetically-pleasing product.

SUMMARY OF THE INVENTION

It is, therefore, one object of the present invention to provide a silicone pressure sensitive adhesive composition containing a polyisobutylene polymer which has a reduced propensity for cold flow. It is another object of the present invention to provide a silicone pressure sensitive adhesive composition which is biocompatible with animal skin. It is yet another object of the present invention to provide a silicone pressure sensitive adhesive composition which can be made hot-meltable. It is still another object of the present invention to provide a silicone pressure sensitive adhesive composition which is capable of being modified to alter properties, such as drug permeability, solubility, adhesiveness, releasibility, and tackiness. It is still another object of the present invention to provide a silicone pressure sensitive adhesive composition which can be made either transparent or white.

To achieve the foregoing objects, the present invention is a pressure sensitive adhesive composition, comprising a mixture of a silicate resin, a polyorganosiloxane fluid, and a polyisobutylene polymer having at least one functionalized silicon containing moiety. The pressure sensitive adhesive composition exhibits tackiness and exhibits adhesiveness upon applying pressure thereto.

Other objects, features, and advantages of the present invention will be readily appreciated as the same becomes better understood after reading the subsequent description.

DETAILED DESCRIPTION OF THE INVENTION

The present invention generally entails a pressure sensitive adhesive composition which contains a mixture of a silicate resin, a polyorganosiloxane fluid, and a polyisobutylene polymer having at least one functionalized silicon containing moiety.

The Silicate Resin and the Polyorganosiloxane Fluid

The silicate resin and the polyorganosiloxane fluid are together employed from about 75 to about 99 weight percent of the composition, and the functionalized polyisobutylene is employed from about 1 to about 25 weight percent of the composition. Preferably, the silicate resin and the polyorganosiloxane fluid are together employed from about 90 to about 99 weight percent of the composition, and the functionalized polyisobutylene is employed from about 1 to about 10 weight percent of the composition.

Typically, the silicate resin and the polyorganosiloxane fluid are employed in a weight ratio from about 40/60 to about 70/30 silicate resin to polyorganosiloxane fluid. It is usually preferred that the silicate resin and the polyorganosiloxane fluid be employed in a weight ratio from about 55/45 to about 65/35 silicate resin to polyorganosiloxane fluid.

The polyorganosiloxane fluids of the present invention are typically functional polyorganosiloxane type fluids. The preferred type of polyorganosiloxane is a silanol terminated polydimethylsiloxane fluid. However, carbinol-functional polyorganosiloxanes, mercapto-functional polyorganosiloxanes, epoxy-functional polyorganosiloxanes, and alkoxy functional polydiorganosiloxanes could be used as well. The polyorganosiloxane fluids preferably have a viscosity of from 50 to 100,000 cs. These fluids are well know in the art, as are their methods for preparation, and further description here is unnecessary.

One silicate resin suitable for the present invention contains a trimethylsilyl-endblocked polysilicate resin consisting of a benzene-soluble resinous copolymer containing silicon-bonded hydroxyl radicals and consisting essentially of triorganosiloxy units of the formula $R_3SiO_{1/2}$ and tetrafunctionalsiloxy units of the formula $SiO_{4/2}$ in a ratio of about 0.6 to 0.9 triorganosiloxy units for each tetrafunctionalsiloxy unit present in the copolymer, wherein each R is a monovalent organic radical independently selected from the group consisting of hydrocarbon radicals of from 1 to 6 carbon atoms. This silicate resin may be blended with a silanol-endblocked polydiorganosiloxane fluid, e.g. a polydimethylsiloxane fluid, which combination is disclosed in U.S. Pat. No. 2,736,721 to Dexter, et al. and U.S. Pat. No. 2,814,601, to Currie, et al., which patents are hereby incorporated by reference.

Another suitable silicate resin and polyorganosiloxane fluid combination useful in the present invention is that or those similar to those disclosed in U.S. Pat. No. 2,857,356, to Goodwin, Jr., which is hereby incorporated by reference. The Goodwin, Jr. patent teaches compositions which consist of a mixture of (i) a cohydrolysis product of a trialkyl hydrolyzable silane and alkyl silicate, wherein the cohydrolysis product contains a plurality of silicon-bonded hydroxy groups, and (ii) a linear, high viscosity organopolysiloxane fluid containing silicon-bonded hydroxy groups.

The silicate resin and the polyorganosiloxane fluid may optionally be condensed together according to a procedure such as that described in Canadian Patent 711,756 to Pail, which patent is hereby incorporated by reference. In such a condensation reaction, the silicate resin and the polyorganosiloxane fluid are mixed together in the presence of an effective amount of a silanol condensation catalyst, and then the silicate resin and the polyorganosiloxane fluid are condensed, for example, by heating under reflux conditions for 1 to 20 hours. Examples of silanol condensation catalysts are primary, secondary, and tertiary amines, carboxylic acids of these amines and quaternary ammonium salts.

Other silicate resin and polyorganosiloxane fluid combinations which are suitable for use in the present invention are those compositions described in U.S. Pat. Nos. 4,591,622 and 4,584,355 to Blizzard et al., U.S. Pat. No. 4,585,836 to Homan et al., and U.S. Pat. No. 4,655,767 to Woodard et al., which patents are hereby incorporated by reference. Generally, these compositions consist of a blend of a silicate resin and a polyorganosiloxane fluid which are chemically treated so as to reduce the silicon-bonded hydroxyl content of the blend. These compositions may optionally be condensed as described immediately above prior to the chemical treatment.

The Functionalized Polyisobutylene Polymer

To form the pressure sensitive adhesive composition, the silicate resin and the polyorganosiloxane fluid are blended with a polyisobutylene polymer having at least one functionalized silicon containing moiety. The functionalized moiety can contain a hydroxyl group (silanol) or other functional group such as alkoxy, acryloxy, vinyl, methacryloxy or allyl.

For example, the functionalized polyisobutylene polymer can have silanol groups located along the polymer chain or at one or both terminals thereof. Such silanol-functional polyisobutylenes are known in the art. For example, Japanese patent publication 70-53882 to Kanegafuchi discloses the hydrosilation of an allyl-functional PIB with an SiH-functional cyclic polysiloxane, followed by hydrolysis in the presence of a palladium catalyst. Further, an alkoxy silane functional PIB may be hydrolyzed to provide the silanol-functional polymer. For other suitable methods for the synthesis of the silanol-functional polymer, the interested reader is referred to the article by P. D. Lickiss in *Advances in Inorganic Chemistry*, v. 42, p. 142 (1995).

A silanol-functional polymer is preferably prepared by first silylating the corresponding allyl- or vinyl-functional polymer with a silane of the formula

followed by hydrolysis of the resulting hydrolyzable group-functional polymer. In the above formula, R is independently selected from the group consisting of a hydrocarbon group having 1 to about 14 carbon atoms and a halogenated hydrocarbon group having 1 to 10 carbon atoms, excluding groups containing aliphatic unsaturation. R preferably contains fewer than 7 carbon atoms. Z is a hydrolyzable group, such as halogen, alkoxy, acyloxy, alkenyloxy, oximo and aminoxy, inter alia, and x is 1 or 2. Preferably, Z is chlorine. This scheme is illustrated by the following two equations, wherein "(Polymer)" represents the polymer chain residue and Z is chlorine.

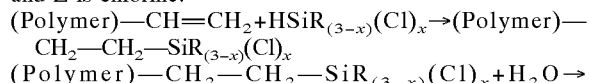
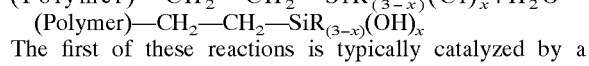

The first of these reactions is typically catalyzed by a hydrosilation catalyst, such as platinum on carbon, chloroplatinic acid or a platinum complex, as well known in the art. Typically, this reaction is carried out either neat or, preferably, in an organic solvent solution at a temperature of about 0 to 250° C., preferably about 20 to 150° C., most preferably at 40 to 100° C. When Z is the preferred chlorine group, the second (hydrolysis) reaction is generally carried out at about 0 to 60° C., preferably in the presence of a base such as sodium bicarbonate which is used to neutralize the hydrochloric acid generated.

Other types of functionalized polyisobutylene can be used in the present invention, such as diorganopolysiloxane-polyisobutylene block copolymers ("ABA polymers" or "AB polymers") described by L. Wilczek et al. *J. Macromol. Sci.-Chem.*, A24(9), 1033–1049 (1987). These copolymers are prepared from telechelic polyisobutylene (PIB) polymers having alcoholic(—CH$_2$OH) terminal groups. The telechelic alcohol-functional PIB is first reacted with butyllithium to form an alcoholate-functional PIB dianion and the latter is then reacted with hexamethylcyclotrisiloxane ($D_3$) to generate a living polydimethylsiloxane (PDMS) chain at each terminus of the PIB. In a final step, the remaining anionic ends are capped with trimethylchlorosilane or dimethyldichlorosilane to provide a PDMS-PIB-PDMS triblock copolymer or a -(PDMS-PIB-PDMS)-$_n$ multiblock copolymer, respectively.

Preferably, the diorganopolysiloxane-PIB block copolymers are prepared so the diorganopolysiloxane segments are linked to the PIB segment(s) via an Si—C bond, this linking group having significantly superior hydrolytic stability relative to the above mentioned C—O—Si linkage. The method for making such polymers are fully disclosed in "BLOCK COPOLYMERS OF POLYISOBUTYLENE AND POLYDIMETHYLSILOXANE" U.S. Ser. No 08/794,695, U.S. Pat. No. 5,741,859, which is incorporated by reference herein. The preparative methods used to make these polymers employ a silanol-functional PIB as a starting material, this precursor being readily synthesized from the corresponding vinyl or allyl-functional polymer. The silanol groups react quickly with butyllithium and formation of the PIB anion is thus essentially instantaneous.

The method for preparing such a polyisobutylene-siloxane block copolymer comprises initiating a polyisobutylene having one or two terminal silanol groups with an organolithium compound to provide a silanolate-functional polyisobutylene. The silanolate-functional polyisobutylene is reacted with a hexaorganocyclotrisiloxane of the formula ($R_2SiO)_3$ in which R is a monovalent group independently selected from the group consisting of alkyl radicals having 1 to 6 carbon atoms, aryl radicals having 6 to 10 carbon atoms, halogenated alkyl radicals having 2 to 6 carbon atoms to form a siloxanolate-functional block copolymer.

After the reaction is complete, the siloxanolate-functional block copolymer is capped with either an acid or a silane of the formula $R'_{(4-a)}SiX_a$ wherein R' is a monovalent group independently selected from the group consisting of alkyl, alkenyl, aryl, halogenated alkyl, acryloxyalkyl, methacryloxyalkyl, and alkenylaryl radicals. X is a hydrolyzable group and a is an integer having a value of 1 to 4.

Polymers having silanol groups or other functional groups such as alkoxy, vinyl or amine functionality, or "ABA" or "AB" block copolymers preferably have number average molecular weights of from 500 to 150,000.

Optional Additives to the Pressure Sensitive Adhesive Composition

The compositions of the present invention may optionally contain viscosity reducing agents (such as trimethyl-endblocked polydimethylsiloxane), drugs, excipients, solvents, and the like. Optionally, the pressure sensitive adhesive compositions of the present invention may include a minor amount of filler, such as extending or reinforcing filler. It is usually desired that the filler be present in an amount less than about 5 weight % based on the total weight of the silicate resin and the polyorganosiloxane fluid, because higher quantities of filler often cause the silicone pressure sensitive adhesive to lose tack and adhesiveness and to increase in viscosity, making it more difficult to coat onto a substrate. In addition, the composition may contain a plasticizer for making the composition hot meltable. The plasticizer can be, for example, a non-functional, endblocked polydiorganosiloxane. Preferred plasticizers include trimethylsilyl endblocked polydimethylsiloxane or non-functional low molecular weight polyisobutylenes, mineral oils, as disclosed in U.S. Pat. No. 5,147,916, or organic ethers, as disclosed in U.S. Pat. No. 4,865,920. The plasticizer is likely to have a viscosity of from 10 cs to 50,000 cs with a preferred viscosity of about 100 cs.

Preparation of the Pressure Sensitive Adhesive Composition

The silicone pressure sensitive adhesive compositions may be made by mixing the components in any order. The functionalized polyisobutlylene can be added via a co-condensation reaction with the polyorganosiloxane fluid and silicone resin, as an endcapping agent or by cold blending the functionalized polyisobutylene with the other prereacted components.

The co-condensation product is prepared by first solvating a blend of the silicate resin and the polyorganosiloxane fluid with a suitable solvent, such as trichlorofluoromethane, hexane, toluene, xylene, or ethylacetate, then (a) blending the functionalized polyisobutylene into the solvated mixture, (b) condensing all the components together, and (c) evaporating the solvent from the blend.

The endcapping product is prepared by (a) solvating a blend of the silicate resin and the polyorganosiloxane fluid with a suitable solvent, such as trichlorofluoromethane, hexane, toluene, xylene, ethyl acetate, (b) condensing them together, (c) blending the mono-functionalized polyisobutylene into the solvated reaction product, (d) condensing the silicone product and polyisobutylene, (e) evaporating the solvent from the blend. The cold blend can be prepared by heating a condensed mixture of the silicate resin and the polyorganosiloxane fluid to sufficiently melt or soften and then slowly adding the functionalized polyisobutylene to the heated blend.

Using the Pressure Sensitive Adhesive Composition

The pressure sensitive adhesive compositions of the invention will adhere to many substrates, such as paper, cloth, glass cloth, silicone rubber, polyethylene, polyethylene terephthalate, polytetrafluoroethylene, glass, wood, metals, and skin.

Many of the pressure sensitive adhesive compositions of the present invention may be coated onto a substrate by hot-melt coating techniques or by applying the compositions in solvent and subsequently evaporating the solvent. To apply the pressure sensitive adhesive compositions to a substrate, the application may be accomplished by using any conventional means, such as, roller coating, dip coating, extrusion, knife coating, or spray coating.

When coating the composition onto a substrate using hot-melt coating techniques, the method typically comprises the steps of (a) heating the pressure sensitive adhesive composition to a coatable temperature above 25° C. (typically above 100° C. and preferably above 150° C.), (b) coating the heated pressure sensitive adhesive composition on the substrate, and (c) cooling the coated pressure sensitive adhesive composition until it is in a generally non-flowing state. The coating temperatures should be low enough so that decomposition of the composition does not occur. Lower temperatures may result in coatable viscosities depending on the coating equipment used, the desired end product, and the composition of the pressure sensitive adhesive composition.

Optionally, after coating, the compositions may be cured. When the composition is to be cured, the composition may further contain a curing catalyst. The process of crosslinking silicone pressure sensitive adhesives is known in the art. For example, see "Silicone Pressure-Sensitive Adhesives" by D. F. Merrill in the *Handbook Of Pressure-Sensitive Adhesive Technology*, edited by D. Satas (Van Nostrand Reinhold, Florence, Ky., 1982), pages 344–352 and "Formulating Silicone Pressure Sensitive Adhesives For Application Performances" by L. A. Sobieski in *Making It Stick in '86, Advances In Pressure - Sensitive Tape Technology*, seminar proceedings (Pressure Sensitive Tape Council, Deerfield, Ill., 1986), pages 1–5, both sources being hereby incorporated by reference.

The pressure sensitive adhesive compositions of this invention are especially suitable for assisting in delivering a bioactive agent, such as a drug, to a bioactive-agent-accepting substrate, such as a patient's skin. The pressure sensitive adhesive composition of this invention may be employed in three modes of bioactive agent delivery. One mode is by incorporating the bioactive agent in the pressure sensitive adhesive composition which is thereafter attached to the substrate to commence delivery. The second mode of delivery is by attaching a membrane of the pressure sensitive adhesive composition to the substrate and contacting a reservoir or matrix including a bioactive agent to the attached membrane. The bioactive agent may then pass from the reservoir or matrix through the attached membrane and to the substrate for absorption. The third mode of delivery is accomplished by applying pressure sensitive adhesive to the perimeter of a delivery device having a bioactive-agent-containing matrix in the center. The delivery device is then attached to the substrate and the bioactive-agent-containing matrix contacts the substrate directly.

The following examples of the invention are meant to be illustrative only and should not be construed as limiting the invention which is properly delineated in the appended claims. In the following examples, all parts and percentages are by weight unless otherwise specified.

EXAMPLES

Measurement of Cold Flow

Cold flow was measured by (a) rolling, into a ball, a piece of the pressure sensitive adhesive composition which weighs, in grams, twice its specific gravity, (b) pressure adhering the ball to a polyester liner inclined to 60°, and (c) measuring the distance the ball moves after 1 day and up to 7 days of being placed on the inclined polyester liner at room temperature. The polyester liner used on the inclined surface was no. 8038 available from 3M (St. Paul, Minn.) An additive to a pressure sensitive adhesive is considered to significantly improve cold flow if the cold flow with the additive is reduced about 5% or more over the cold flow of the pressure sensitive adhesive without the additive. For the compositions of the present invention, a cold flow of less than 14 mm per 7 days is desirable.

Measurement of Complex Viscosity

Complex Viscosity (ETA*) measured in Poise was measured on the adhesive compositions using a Dynamic Spectrometer, Model RDS2, available from Rheometric-Scientific™, Piscataway, N.J. Complex viscosity is an indication of a composition's workability as hot melt pressure sensitive adhesive. Generally it is preferred that compositions measured at 140° C. will have a complex viscosity of 300 to 13,000 ETA* and compositions measured at 200° C. will have a complex viscosity of 100 to 1,200 ETA*.

A dynamic temperature step sweep is used to determine the response of a material to changes at a fixed frequency and a variable percent strain. The dynamic temperature sweep of the present invention was conducted starting at a temperature of about 140° C., then at temperatures of 160° C., 180° C., and 200° C. Testing was done at a frequency of 100 radians/second on samples of 1.000 mm thickness and weight of 4.00 grams. Either the 50 mm cup and plate fixture were used or the 25 mm. parallel plate were used in the examples, however, the skilled artisan will appreciate that the values obtained for the measurements would be the same whether the cup and plate fixture or the parallel plate fixture were used. To run the test, 4 grams of the material to be tested was placed in the cap and plate or the parallel plate. The material was heated, and the test plate was moved to 1 mm. Data was collected when the temperature reached 140° C. The temperature was ramped up in 20° C. increments, for 720 seconds, at which time viscosity was measured in an occiliary mode, at preprogram frequency (100 radians/sec.), and strained. The samples, as determined by a strain sweep, were run within the linear visco-elastic region for each sample.

Compositions

The components used to prepare the compositions are described below.

Silicone Resins

Resin A ("Res A") was prepared according to the method of U.S. Pat. No. 2,676,182 to Daudt, et al., which is hereby incorporated by reference, and consisted of 70 wt % xylene solution of a siloxane resin copolymer consisting essentially of $(CH_3)_3SiO_{1/2}$ units and $SiO_2$ units in a molar ratio of approximately 0.70:1 and containing 2.4 to 2.9 weight percent hydroxyl based on solids as determined by FTIR (ASTM E- 168).

Resin B ("Res B") was prepared according to the method of U.S. Pat. No. 2,676,182 to Daudt, et al., which is hereby incorporated by reference, and consisted of 70 wt % xylene solution of a siloxane resin copolymer consisting essentially of $(CH_3)_3SiO_{1/2}$ units and $SiO_2$ units in a molar ratio of approximately 0.75:1 and containing 2.4 to 2.9 weight percent hydroxyl based on solids as determined by FTIR (ASTM E-168).

Polyorganosiloxane fluids

The polyorganosiloxane fluid ("FLUID") was a homogeneous mixture of a hydroxyl-endblocked polydimethylsiloxane having a number-average molecular weight of approximately 40,000 and minor amounts of cyclic polydimethylsiloxane having degrees of polymerization between 4 and 30, the mixture having a viscosity between 12,000 and 15,000 centipoise as measured using a Brookfield Viscometer Model HAF with spindle #3 at 10 RPM's.

Functionalized Polyisobutylene Polymers

The functionalized polyisobutylene copolymers used in the examples are described as follows:

PIB A was a silanol terminated polyisobutylene having a number average molecular weight of about 6,448.

PIB B was a silanol terminated polyisobutylene having a number average molecular weight of about 26,210.

PIB C was a polyisobutylene having a single silanol molecule at one end and a number average molecular weight of about 1,496.

PIB D was an ABA polyisobutlylene block copolymer having a number average molecular weight of 50,610, where the "A" blocks are polydimethylsiloxanes having a degree of polymerization of 603 (44,622 mw) and a hydroxyl functionality at the terminal end, and the "B" blocks are a polyisobutylene having a degree of polymerization of 107 (5,992 mw).

PIB E was an AB polyisobutlylene block copolymer having a number average molecular weight of 19,260, where the "A" blocks are polydimethylsiloxanes having a degree of polymerization of 240 (17,760 mw) and a hydroxyl functionality at the terminal end, and the "B" blocks are polyisobutylene having a degree of polymerization of 27 (1,152 mw).

PIB F was a polyisobutylene terminated with a silicone having two methoxy groups on each end and having a number average molecular weight of about 5,000.

Additives

Dow Corning 360 medical fluid is a trimethyl endblocked polydimethyl siloxane available from the Dow Corning Corporation (Midland, Mich.) having a viscosity of 100 cs.

Methods of Preparation

To prepare the co-condensed compositions of the examples, the silicone resin, polyorganosiloxane fluid, PIB polymers were mixed together in the ratios indicated in the tables below, then xylene added to obtain the desired non-volatile content. The mixtures were heated at 115° C., for 2 to 4 hours in the presence of ammonia gas. The mixtures were then heated to 140° C. to strip off the ammonia.

If hot melt adhesives were prepared, 360 Fluid was added, then the xylene and any remaining volatiles were stripped off.

Table 1 below shows the results of a typical co-condensed pressure sensitive adhesive without the functionalized PIB, which exhibits a cold flow at 15 mm over a seven day period.

TABLE 1

| Condensation Formulation | Temperature Sweep (PS) | | | Sweep (PS) | |
| --- | --- | --- | --- | --- | --- |
| Res B/Fluid/ PIB A/360 | ETA* 140 C. | ETA* 160 C. | ETA* 180 C. | ETA* 200 C. | Cold Flow, day-mm. |
| 60/40/0/0 | 2280 | 1344 | 886 | 623 | 1d-10, 4d-13, 7d-15 |

As seen below in Tables 2–8, pressure sensitive adhesives incorporating the functionalized polyisobutylene showed a significant improvement in cold flow, with reported values ranging from 0.05 mm to 12 mm over seven days, with an average of 4.8 mm. This average represents a 200% improvement over the control in Table 1. Tables 2–10 represent different combinations of different resins in combinations with different functionalized PIB polymers. Some of the compositions are co-condensed, as illustrated in Tables 2–8, and others are end-capped as illustrated in Tables 9 and 10.

Co-Condensation Formulations

TABLE 2

| | Temperature Sweep (PS) | | | | |
| --- | --- | --- | --- | --- | --- |
| Res A/FLUID/ PIB A/360 | ETA* 140 C. | ETA* 160 C. | ETA* 180 C | ETA* 200 C. | Cold Flow, day-mm. |
| 60/39/1/0 | 4100 | 2549 | 1685 | 1100 | 1d-1, 3d-1.5, 7d-1.5 |
| 57/37.05/.95/5 | 2284 | 1591 | 1122 | 785 | 1d-2, 3d-2.5, 7d-2.5 |
| 51/34/6.38/15 | 1107 | 773 | 556 | 410 | 1d-1.5, 3d-1.5, 7d-2 |
| 45/30/5.4/25 | 316 | 241 | 185 | 145 | 1d-2, 3d-3, 7d-4 |
| 60/30/10/0 | 10200 | 4834 | 2519 | 1329 | 1d-0, 3d-0.5, 7d-1 |
| 42/21/7/30 | 359 | 280 | 220 | 175 | 1d-0.5, 3d-0.5, 7d-1 |

TABLE 3

| | Temperature Sweep (PS) | | | | |
| --- | --- | --- | --- | --- | --- |
| Res B/FLUID/ PIB A/360 | ETA* 140 C. | ETA* 160 C. | ETA* 180 C. | ETA* 200 C. | Cold Flow, day-mm. |
| 60/39/1/0 | 1500 | 834 | 530 | 360 | 1d-3, 4d-4, 7d-5.5 |
| 60/30/10/0 | 2743 | 1244 | 705 | 466 | 1d-1, 4d-2, 7d-2 |
| 54/27/9/10 | 1356 | 815 | 505 | 336 | 1d-5, 4d-5, 7d-7 |

TABLE 4

| | Temperature Sweep (PS) | | | | |
| --- | --- | --- | --- | --- | --- |
| Res A/FLUID/ PIB B/360 | ETA* 140 C. | ETA* 160 C. | ETA* 180 C. | ETA* 200 C. | Cold Flow, day-mm. |
| 60/39/1/0 | 3333 | 1925 | 1172 | 762 | 1d-0, 4d-0.5, 7d-0.5 |
| 57/37.05/.95/5 | 1603 | 983 | 617 | 415 | 1d-0.5, 4d-1.5, 7d-2 |
| 60/30/10/0 | 12234 | 4891 | 2281 | 1161 | 1d-2, 4d-2, 8d-2 |
| 57/28.5/9.5/5 | 2856 | 1384 | 700 | 397 | 1d-1, 3d-2, 7d-2 |
| 54/27/9/10 | 921 | 480 | 280 | 177 | 1d-4, 3d-9, 7d-10 |

TABLE 5

| | Temperature Sweep (PS) | | | | |
| --- | --- | --- | --- | --- | --- |
| Res A/FLUID/ PIB C/360 | ETA* 140 C. | ETA* 160 C. | ETA* 180 C. | ETA* 200 C. | Cold Flow, day-mm. |
| 60/30/10 | 598 | 233 | 130 | 72 | 1d-1, 3d-1, 7d-2 |
| 57/28.5/9.5/5 | 470 | 240 | 134 | 80 | 1d-2, 3d-4, 7d-6 |

TABLE 6

| | Temperature Sweep (PS) | | | | |
| --- | --- | --- | --- | --- | --- |
| Res A/FLUID/ PIB D/360 | ETA* 140 C. | ETA* 160 C. | ETA* 180 C. | ETA* 200 C. | Cold Flow, day-mm. |
| 57/30.4/7.6/5 | 2329 | 1453 | 944 | 632 | 1d-5.5, 4d-7, 7d-7 |
| 54/28.8/7.2/10 | 1224 | 809 | 547 | 381 | 1d-7, 4d-11, 7d-12 |

TABLE 7

| | Temperature Sweep (PS) | | | | |
| --- | --- | --- | --- | --- | --- |
| Res A/Fluid/ PIB E | ETA* 140 C. | ETA* 160 C. | ETA* 180 C. | ETA* 200 C. | Cold Flow, day-mm. |
| 60/32/8 | 1876 | 1088 | 662 | 423 | 1d-1, 3d-6, 7d-7 |

TABLE 8

| | Temperature Sweep (PS) | | | | |
| --- | --- | --- | --- | --- | --- |
| Res A/Fluid/ PIB F/360 | ETA* 140 C. | ETA* 160 C. | ETA* 180 C. | ETA* 200 C. | Cold Flow, day-mm. |
| 60/30/10/0 | 3612 | 1670 | 829 | 456 | 1d-0, 5d-0 |
| 57/28.5/9.5/5 | 1098 | 631 | 398 | 263 | 1d-0, 5d-0 |
| 54/27/9/10 | 588 | 360 | 230 | 153 | 1d-5, 5d-11 |
| 51/25.5/8.5/15 | 357 | 222 | 145 | 99 | 1d-11, 3d-15 |

Encapping

In the case where the monofunctional PIB was added as an endcapping agent, the same procedure for co-condensation was used but the monfunctional PIB's were added after resin and fluid reached a viscosity of about 8,000 cps. The results are shown in Tables 9 and 10. Again, the cold flow was significantly improved over the control sample in Table 1.

TABLE 9

| Res A/Fluid/ PIB C/360 | ETA* 140 C. | ETA* 160 C. | ETA* 180 C. | ETA* 200 C. | Cold Flow, day-mm. |
|---|---|---|---|---|---|
| 59.4/39.6/1/0 | 2317 | 1297 | 766 | 504 | 1d-1, 3d-2, 8d-5 |
| 58.8/39.2/.99/1 | 2810 | 1673 | 1043 | 685 | 1d-5, 4d-9, 7d-10 |
| 58.2/38.8/3 | 2145 | 1333 | 866 | 587 | 1d-3, 3d-4, 8d-6 |
| 57.6/38.4/3/1 | 2555 | 1533 | 936 | 578 | 1d-8, 4d-10, 7d-10 |

TABLE 10

| Res A/Fluid/PIB E | ETA* 140 C. | ETA* 160 C. | ETA* 180 C. | ETA* 200 C. | Cold Flow, day-mm. |
|---|---|---|---|---|---|
| 58.8/39.2/2 | 3011 | 1851 | 1196 | 800 | 1d-2, 3d-2, 7d-2 |

What is claimed is:

1. A pressure sensitive adhesive composition, comprising:
   (A) a silicate resin;
   (B) a polyorganosiloxane fluid; and
   (C) a polyisobutylene polymer having at least one functionalized silicon containing moiety,
   wherein the pressure sensitive adhesive composition exhibits tackiness and adhesiveness upon applying pressure thereto.

2. The pressure sensitive adhesive composition of claim 1, wherein the silicate resin is a benzene-soluble resinous copolymer containing silicon-bonded hydroxyl radicals and consisting essentially of triorganosiloxy units of the formula $R_3SiO_{1/2}$ and tetrafunctionalsiloxy units of the formula $SiO_{4/2}$ in a ratio of about 0.6 to 0.9 triorganosiloxy units for each tetrafunctionalsiloxy unit present in the copolymer, wherein each R is a monovalent organic radical independently selected from the group consisting of hydrocarbon radicals of from 1 to 6 inclusive carbon atoms.

3. The pressure sensitive adhesive composition of claim 1, wherein the silicate resin is a cohydrolysis product of a trialkyl hydrolyzable silane and an alkyl silicate, wherein the cohydrolysis product contains a plurality of silicon-bonded hydroxy groups.

4. The pressure sensitive adhesive composition of claim 1, wherein the silicate resin and the polyorganosiloxane fluid together constitute from about 75 to about 99 weight percent of the pressure sensitive adhesive composition and the polyisobutylene polymer having at least one functionalized silicon moiety constitutes from about 1 to about 25 weight percent of the pressure sensitive adhesive composition.

5. The pressure sensitive adhesive composition of claim 1, wherein the degree of polymerization of the polyorganosiloxane fluid is from about 400 to about 10,000.

6. The pressure sensitive adhesive composition of claim 1, wherein the polyorganosiloxane fluid is selected from the group consisting of polyorganosiloxanes, carbinol-functional polyorganosiloxanes, silanol polyorganosiloxanes, mercapto-functional polyorganosiloxanes, and epoxy-functional polyorganosiloxanes, and alkoxy functional polydiorganosiloxanes.

7. The pressure sensitive adhesive composition of claim 1, wherein the functionalized silicon containing moiety has at least one hydroxyl, alkoxy, acrloxy, methacrloxy, vinyl, or allyl group bonded to a silicon atom.

8. The pressure sensitive adhesive composition of claim 1, wherein the polyisobutylene polymer having at least one functionalized silicon containing moiety has a number average molecular weight of from 1,000 to 40,000.

9. The pressure sensitive adhesive composition of claim 1, wherein the polyisobutylene polymer has two ends, and a functionalized silicon containing moiety disposed at one of the ends.

10. The pressure sensitive adhesive composition of claim 1, wherein the polyisobutylene polymer has two ends, and a functionalized silicon containing moiety disposed at each end.

11. The pressure sensitive adhesive composition of claim 10, wherein the functionalized silicon containing moiety has at least one hydroxyl or alkoxy group bonded to a silicon atom.

12. The pressure sensitive adhesive composition of claim 9, wherein the functionalized silicon containing moiety has at least one hydroxyl or alkoxy group bonded to a silicon atom.

13. The pressure sensitive adhesive composition of claim 1, wherein the polyisobutylene polymer having at least one functionalized silicon containing moiety is a diorganopolysiloxane-polyisobutylene block copolymer.

14. The pressure sensitive adhesive composition of claim 13, wherein the functionalized silicon containing moiety has at least one hydroxyl or alkoxy group bonded to a silicon atom.

15. The pressure sensitive adhesive composition of claim 1, wherein the composition includes a plastisizer.

16. A pressure sensitive adhesive composition comprising the reaction product of: blending components (A), (B), and (C), then heating said blend in the presence of a silanol condensation catalyst, wherein (A) is a silicate resin, (B) is a polyorganosiloxane fluid, and (C) is a polyisobutylene polymer having at least one functionalized silicon containing moiety.

17. A pressure sensitive adhesive composition comprising the reaction product of: blending components (A) and (B), then heating in the presence of a catalyst to form a reaction intermediate, then adding component (C) to the reaction intermediate, wherein and (A) is a silicate resin, (B) is a polyorganosiloxane fluid, and (C) is a polyisobutylene polymer having at least one functionalized silicon containing moiety.

18. The pressure sensitive adhesive composition of claim 1, wherein the composition contains a solvent.

19. The pressure sensitive adhesive composition of claim 1, wherein the composition contains a bio-active agent.

20. A transdermal drug delivery system having the pressure sensitive adhesive composition of claim 1.

* * * * *